United States Patent [19]
Keller et al.

[11] Patent Number: 4,958,054
[45] Date of Patent: Sep. 18, 1990

[54] DIELECTRIC DRYING OF HOT PLASTIC FOOD EXTRUDATE

[75] Inventors: Lewis C. Keller, Watauga; Cecil A. Bowles, Lewisville, both of Tex.

[73] Assignee: Fritto-Lay Inc., Dallas, Tex.

[21] Appl. No.: 924,551

[22] Filed: Oct. 29, 1986

[51] Int. Cl.⁵ .............................................. H05B 6/62
[52] U.S. Cl. ........................... 219/10.55 M; 219/10.67; 219/10.57; 99/451; 99/443 R; 34/236
[58] Field of Search .................... 219/10.55 M, 10.57, 219/10.67, 10.73, 10.69; 426/241, 242, 244, 247; 99/DIG. 14, 483, 443, 323.4, 236; 34/63, 156

[56] References Cited

U.S. PATENT DOCUMENTS

| | | | |
|---|---|---|---|
| 2,023,478 | 12/1935 | Kremer | 219/10.55 M |
| 2,054,756 | 9/1936 | Kremer | 426/242 |
| 2,054,937 | 9/1936 | Kremer | 426/242 |
| 2,103,469 | 12/1937 | Kremer | 426/242 |
| 2,454,370 | 11/1948 | Beaubien | 219/10.55 M |
| 2,602,134 | 7/1952 | Nelson | 99/323.5 |
| 2,685,518 | 8/1954 | Prohaska | 219/10.69 |
| 2,685,833 | 8/1954 | Hagopian | 426/241 |
| 2,783,350 | 2/1957 | Pircon | 219/10.69 |
| 3,082,710 | 3/1963 | Holland | 99/323.4 |
| 3,630,755 | 12/1971 | Schirfmann | 219/10.55 M |
| 4,045,639 | 8/1977 | Meisel | 219/10.55 M |
| 4,535,552 | 8/1985 | McManus | 426/242 |
| 4,546,226 | 10/1985 | Trembley et al. | 219/10.69 |
| 4,624,854 | 11/1986 | Naumann et al. | 219/10.55 M |

FOREIGN PATENT DOCUMENTS

| | | |
|---|---|---|
| 1406082 | 6/1965 | France . |
| 0126039 | 7/1985 | Japan .................................. 426/242 |
| 1086544 | 10/1967 | United Kingdom . |
| 1401601 | 7/1975 | United Kingdom . |

OTHER PUBLICATIONS

"Heating with Microwaves", Philips Technical Library, pp. 1-3, by Pouchner.
McGraw-Hill Encyclopedia of Science & Technology/6th Edition (An International Reference Work in Twenty Volumes Including An Index) 5 DAC-ELA.
McGraw-Hill Encyclopedia of Science and Technology/6th Edition (An International Reference Work in Twenty Volumes Including An Index) 11 MET-NIC.
Electric Process Heating (Technologies/Equipment/Applications) McCormick, Richard, "Dielectric Heat Seeks Low Moisture Applications", *Prepared Foods*, Sep. 1988.

*Primary Examiner*—M. H. Paschall

[57] ABSTRACT

A dielectric method of drying a hot plastic food extrudate comprises extruding the hot plastic food material from a food extruder, passing the extruded hot plastic food material while the material is still plastic to a dielectric heating apparatus which is in close proximity to the food extruder, and subjecting the hot plastic food material to dielectric heating.

7 Claims, 1 Drawing Sheet

DIELECTRIC DRYING OF HOT PLASTIC FOOD EXTRUDATE

BACKGROUND OF THE INVENTION

1. Field of the Invention

This invention relates to improvements in the use of dielectric heating in the production of food products. More specifically, this invention relates to the use of dielectric heating in close proximity to a food extruder to significantly accelerate the drying of the extruded food product.

2. Description of the Background Art

Dielectric heating has been used in a wide variety of industries since the 1930's when dielectric heating was utilized by the tobacco industry to dry tobacco. Since then, dielectric heating has been utilized in the ceramics, paper, food, oil, leather and glass industries for purposes as diverse as plastic pre-heating, wood gluing, cork heating, sterilization and foundry core baking.

In the food industry, dielectric heating has long been used in combination with conventional ovens for cookie and cracker drying. U.S. Pat. No. 3,082,710 to Holland, describes a process and apparatus for baking biscuits with a combination of conventional heating and dielectric heating. The biscuits are baked first in a conventional oven at hot temperatures to brown the outside of each biscuit. Then, the biscuits are placed in a dielectric oven to cook the inside portions. Apparatus for use in a similar two-step process is described in U.S. Pat. No. 2,454,370 to Beaubien, which discloses conventional radiant heating means to toast the outside of the food product and high-frequency dielectric-field heating means to bake the inner portion of the food product. The Beaubien apparatus also provides a conveyor on which the food is moved through each oven.

The known processes which employ both conventional and dielectric heating operate so that the conventional oven is used first to set the structure and brown the surfaces of the food product and the dielectric heating apparatus is used next to speed up the final cooking of the food product. This combination of conventional and dielectric heating methods is employed in an attempt to gain precise control over the moisture endpoint of the final product, and shortens the total time required to dry to the desired moisture end point, thus enabling increased production rates and less floor space. Despite the decreased baking time required by this two-step process compared to completely baking a product in a conventional oven, the food products must still spend considerable time in the conventional oven before the products are ready to be heated in a dielectric oven.

There is a need in the art for a simple process for greatly reducing the drying time of hot plastic extruded food materials, and to decrease the floor space required for drying extruded food material. Dielectric drying of an extrudate would be advantageous over conventional drying which currently takes a great deal of manufacturing floor space. However, Applicant is unaware of any teachings in the art that dielectric drying of a hot plastic food material extrudate while still plastic would be useful in reducing the drying time and space required for drying.

SUMMARY OF THE INVENTION

In accordance with the present invention, a method of drying a hot plastic food material comprises extruding hot plastic food material from a food extruder in a food extruding zone, passing the extruded plastic food material while the material is still plastic to a dielectric heating apparatus in a dielectric heating zone which is in close proximity to the food extruding zone, and subjecting the hot plastic food material to dielectric heating.

DESCRIPTION OF THE PREFERRED EMBODIMENT

This invention resides in a method of drying a hot plastic food material by dielectric heating while the material is still in a plastic state. As the hot plastic food material is forced out of an extruder, the material passes while still plastic to a dielectric heating apparatus where the material is subjected to dielectric heating.

Figure 1:
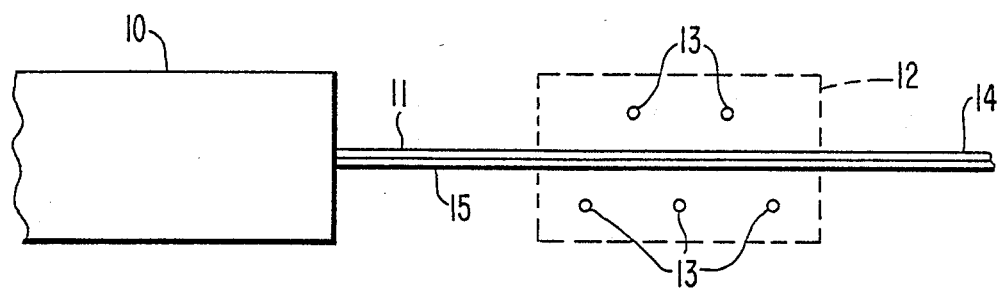
FIG. 1 is a diagrammatic view of an extruder and a dielectric heating apparatus showing the proximity of the extruder and dielectric heating apparatus which is necessary to carry out the method of this invention.

FIG. 1 shows a diagram of the preferred apparatus for carrying out the method of this invention. A dielectric heating apparatus 12 is located in close proximity to a food extruder 10. Hot plastic extruded food material 11 passes into the dielectric heating apparatus 12 which has an array of staggered electrodes 13 which produce the dielectric heating when a voltage is applied to the electrodes. The distance between the food extruding zone comprising the food extruder and the dielectric heating zone comprising the dielectric heating apparatus will depend partially on how long the particular food material will remain plastic. Alternatively, the space between the extruder and the dielectric heating apparatus may be heated to maintain the food material in a plastic state. The preferable distance is less than three feet. The length of the dielectric heating zone is chosen in coordination with the speed of the extrudate 11 to provide an appropriate residence time as discussed below. The food material may be passed through the dielectric heating apparatus on a conveyor or belt 15, preferably a polymeric belt which does not absorb energy in the dielectric field. A preferred polymeric belt is a rayon belt. The food material exits from the dielectric heating apparatus as a dried food product 14 with most of the moisture removed as a result of the dielectric heating.

The dielectric heating of the hot plastic food material greatly accelerates the drying of the extruded material. Use of this process to dry hot extruded plastic material also significantly decreases the floor or line space required to dry and prepare the food material into a final food product.

The plasticity of a food extrudate is a function of water and other food components in the mixture being extruded which, under conditions found in a cooking extruder, act together to produce a pliable, deformable extrudate. A plastic food material is moldable, pliable and deformable until it becomes rigid, after which the material cannot be heated and made plastic again by reheating. A product within the temperature and moisture content ranges of the invention loses plasticity continuously and becomes comparatively rigid within a few seconds after emerging from the die of the food extruder.

Figure 2:
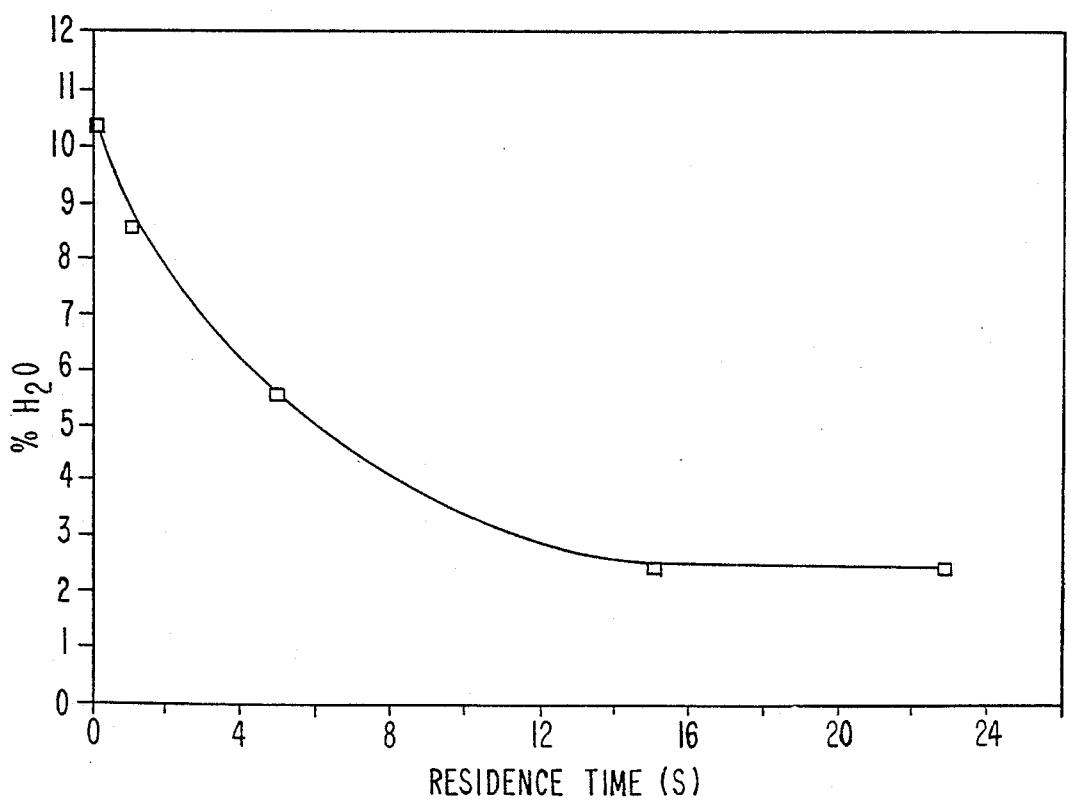
FIG. 2 is a graph which illustrates the rate of drying of a hot plastic food material using the process of this invention.

The dielectric heating apparatus operates on the principle of alignment of dipolar molecules (almost exclusively H$_2$O in foods) within an electrical field. This is accomplished by applying a voltage potential across a defined space through which the food product passes. The dielectric properties of the food material determine the amount of energy absorbed. The polarity of the field is rapidly reversed during operation, causing water molecules to rotate as they undergo successive realignments with the reversing field. Heat is generated thereby, resulting in the evaporation of water. The heat develops in proportion to the concentration of the water molecules and this, in turn, yields a self-leveling effect on the final moisture content. FIG. 2 illustrates the effect of dielectric heating on the moisture content of the hot plastic food material.

When the product has cooled and "set," the dielectric heating is not as efficient. There are two reasons why drying is slower after the product sets; sensible heat is lost, and mass transfer is impeded by the "set" structure.

Much of the sensible heat existing in the product as it emerges from the die of the food extruder is dissipated or lost by the time the product is "set" and no longer in a plastic state. This means energy from the dielectric oven must first be used to raise the temperature of the product to reach the boiling point before drying may begin, and drying is inhibited by the rigid cell structure of the cooled product, which slows migration of water from the inside of the product to the outside atmosphere. Once the structure is "set," or rigid, it is not revertible to the plastic state in which it emerged from the die. At this point, the evaporation rate within the food material will be greatly reduced, and continued dielectric heating will have comparatively little further effect on the moisture content of the material. That is, water is not as free to move out of the hot plastic material after the shell structure becomes rigid or "set." The final moisture content can thus be controlled by the residence time of the food material in the dielectric heating apparatus up to the point when the shell structure is set and the proportion of water remaining results in less energy being absorbed by the product, whereafter little further moisture will be removed. This self-leveling effect may be seen in FIG. 2 between residence times 15 seconds and 23 seconds. FIG. 2 also shows the speed of the method of this invention in drying hot plastic food material since most of the moisture in the material is removed in about 12 seconds.

Food materials which may be efficiently dried with a dielectric heater are those which have a uniform thickness dimension, and have an initial moisture content in the range of about 20% or below. Examples are extruded materials, crackers, cookies, sliced vegetables, sheeted films and slurries of food materials. Crackers or cookies are first baked by conventional means to a moisture content somewhat more than desired for the finished product and final moisture removal is accomplished by dielectric drying. Sliced vegetables and sheeted or slurried food materials are also produced by an appropriate method to bring their moisture contents into the range of efficient operation for the dielectric dryer. The method of this invention is carried out on various snack food materials such as farinaceous materials, particularly those which are extruded at high temperatures. The method is particularly useful in the preparation of hot plastic food products made using farinaceous materials. See, e.g., a disclosure for producing these products in U.S. Pat. No. 4,613,509 granted Sept. 23, 1986, assigned to the assignee of this application.

Any type of cooking extruder may be used for the method of this invention. A twin-screw extruder may be preferred for a specific process, since it affords greater control over processing variations which might affect the thickness uniformity of the extruded food material, one of the requisite conditions for efficient utilization of dielectric heating.

The temperature of the extrudate as it exits the cooking extruder may be between about 212° F and about 400° F. A typical food material may be between about 280° F. and about 340° F as it exits from the die of the food extruder. This temperature is a factor in the plasticity of the food material and may affect the parameters of operation of the dielectric heating apparatus.

The residence time in the dielectric heating apparatus required for proper drying of each food material will vary and food materials which require a longer time may be passed through a longer dielectric heating zone or a dielectric heating apparatus capable of transmitting more energy to the food materials. In the alternative, two or more dielectric heating units may be placed in line with one another to provide the additional dielectric heating time. The residence time of the food material in the dielectric heating zone should be long enough for efficient drying to occur. The final moisture content may be controlled by the voltage setting of the dielectric heating apparatus, if desired, rather than the residence time of the hot plastic food material undergoing dielectric heating. Increased power supplied to the product increases the rate of heating of the product, increases the rate of evaporation of water from the product, and therefore decreases the residence time required to dry a food material to a specified moisture level depending on the initial moisture content of the product. The moisture level is a major determinant of how much power may be absorbed by the product. A product at 15% moisture will absorb more energy when introduced into the dielectric field than a product at 10% moisture. Preferred operating limits will vary with the design of the dielectric dryer, initial moisture content of the product, and other product characteristics.

This method presents a significant savings in plant line space as well as in drying time. For example, a 12-foot dielectric heating apparatus can dry the same amount of hot plastic food material as an 80-foot conventional drying apparatus in much less time. For a farinaceous type food product extruded at high temperatures, the drying time may be reduced by a factor of approximately 8-fold using the process of this invention with a corresponding reduction in line space.

It is expected that this drying process may also intensify and develop flavor of the food material and may also increase structural strength in the completely prepared food product (e.g., resistance to chipping or breakage of cellular-structure materials such as collets). As a result of the dielectric drying, the food product may be expected to have a more pleasing appearance due to reduced checking (a product defect characterized by cracking or chipping of the product surface, such as in a cracker). This would also improve productivity by reducing the amount of scrap produced in the preparation of the product.

EXAMPLES

The following examples demonstrate the use of dielectric heating in accordance with the present invention to dry a hot plastic extruded food material.

In each of the examples, the following procedure and apparatus were used. Wheat collets were cooked and extruded using a Baker-Perkins Model No. MPF-50D twin screw extruder, available from the Baker-Perkins Company, Grand Rapids, Mich.

The collets were formed from a dry mixture comprising about 90 weight percent whole wheat flour and about 10 weight percent white corn meal. This dry mixture had an inherent moisture content of about twelve weight percent. Water was also separately injected into the extruder at a rate sufficient to obtain a total moisture content of about 20 weight percent of the mixture inside the barrel of the extruder. The mixture within the extruder was heated to about 280-340° F. (138-171° C.) by the time it reached the die.

Upon exiting the extruder some water vapor was naturally flashed-off. The moisture content of the extruded collet, after cooling to ambient temperature without any further processing, was measured to be about 12.4 weight percent.

In each of the following examples, the extrudate was immediately conveyed from the die through two dielectric ovens placed in line with the extruder and with each other, and having a common conveyor to carry the extrudate therethrough. The dielectric ovens were 20 Kw 40MHz units from the Radio Frequency Company. Each oven was about ten feet long including conveying and housing mechanisms and having a four foot long electrode section. A separate heater was used to heat the air introduced to the electrode area to prevent moisture from condensing on the electrodes.

Examples 1-5 determined the amount of moisture removed from the extrudate as a function of electrode plate current when the air heater was set at about 150° F. (66° C.). Examples 6-10 determined the amount of moisture removed from the extrudate as a function of electrode plate current when the air heater was set at about 250° F. (121° C.). The results of these tests are shown in Table 1 below.

various degrees of dielectric heating. In Example 5, more than fifty-seven percent of the total moisture content of the extrudate was removed when subjected to dielectric heating at about 2 amps electrode current for about 12 seconds.

Example 6 indicates that, with no dielectric heating, the moisture content of the extrudate is about 11.4 weight percent upon exiting the ovens maintained at about a 250° F. (121° C.) air temperature. Examples 7-10 show the additional moisture reduction obtainable with dielectric heating. As shown in Examples 8-9, the total moisture content of the extrudate can be reduced to less than 2 weight percent by employing dielectric heating. Such a moisture content is desired for a collet product having requisite shelf-life and texture. It is additionally noted that this low moisture drying occurred with a dielectric heating time of about fourteen seconds and with oven means about twenty feet long. Collets dried by this process had no detrimental flavor, texture or color variances from conventionally dried product.

It is understood that the above examples are illustrative of the invention and not intended in any way to be limiting. Additionally, modifications to the invention may be contemplated and are intended to fall within the scope of the appended claims.

We claim:

1. A method of drying an extruded hot plastic food material initially at a temperature of between about 212° F. and 400° F. comprising dielectrically heating the hot plastic food material while said material is still in a plastic state.

2. The method as in claim 1 wherein the hot plastic food material is at a temperature between about 280° F. and 340° F. at the beginning of the dielectric heating.

3. A method of producing an extruded food product comprising extruding a hot plastic food material from a food extruding zone at a temperature of between about 212° F. and 400° F., and dielectrically heating the extruded material in a dielectric heating zone while said material is still in a plastic state to dry said material.

4. The method of claim 3 wherein the food material is in the dielectric heating zone long enough for a desired degree of drying of the food material to occur.

5. The method of claim 3 wherein the food material

TABLE 1

| EFFECT OF DIELECTRIC HEATING ON HOT EXTRUDED COLLETS | | | | |
|---|---|---|---|---|
| EXAMPLE | PLATE CURRENT UNIT 1/UNIT 2 (AMP) | AIR TEMPERATURE UNIT 1/UNIT 2 (°F.) | RESIDENCE TIME IN DIELECTRIC FIELDS (SECONDS) | PERCENT MOISTURE IN COLLET AFTER COOLING TO AMBIENT TEMPERATURE |
| 1 | 0/0 | 150/150 | 0 | 12.1 |
| 2 | 1/1 | 150/150 | 12 | 10.2 |
| 3 | 1.5/1.5 | 150/150 | 12 | 7.3 |
| 4 | 2/1 | 150/150 | 12 | 7.7 |
| 5 | 2/2 | 150/150 | 13 | 5.3 |
| 6 | 0/0 | 250/250 | 0 | 11.4 |
| 7 | 2.5/2.5 | 250/250 | 13 | 2.9 |
| 8 | 3/2.8 | 250/250 | 14 | 1.7 |
| 9 | 4/2.8 | 250/250 | 14 | 1.2 |
| 10 | 3.7/0 | 250/250 | 7 | 4.7 |

As can be seen from Example 1, when no dielectric heating occurs, the moisture content of the extrudate is reduced from the 12.4 weight percent measured when cooled in ambient air to about 12.1 weight percent when exposed to a temperature of about 150° F. (66° C.) for about 12 seconds. Examples 2-5 depict the additional moisture reduction in the extrudate when subjected to has a uniform thickness.

6. The method of claim 3 wherein the food material is a farinaceous material.

7. The method of claim 3 wherein the food material has an initial moisture content of about 20% or less.

* * * * *

UNITED STATES PATENT AND TRADEMARK OFFICE
CERTIFICATE OF CORRECTION

PATENT NO. : 4,958,054

DATED : September 18, 1990

INVENTOR(S) : Lewis C. KELLER and Cecil A. Bowles

It is certified that error appears in the above-identified patent and that said Letters Patent is hereby corrected as shown below:

Cover page [73] delete "Fritto-Lay" and substitute therefor --Frito-Lay--.

Signed and Sealed this

Second Day of June, 1992

Attest:

DOUGLAS B. COMER

*Attesting Officer*    Acting Commissioner of Patents and Trademarks